United States Patent
Bartneck et al.

(10) Patent No.: US 11,801,710 B2
(45) Date of Patent: Oct. 31, 2023

(54) FIBER-COMPOSITE VENTILATION FLAP FOR A VEHICLE AND WHEEL FOR A VEHICLE

(71) Applicant: Bayerische Motoren Werke Aktiengesellschaft, Munich (DE)

(72) Inventors: Niklas Bartneck, Garching (DE); Tobias Mueller-Kambeitz, Landau (DE); Hubert Scholz, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 450 days.

(21) Appl. No.: 16/979,948

(22) PCT Filed: Feb. 6, 2019

(86) PCT No.: PCT/EP2019/052864
§ 371 (c)(1),
(2) Date: Sep. 11, 2020

(87) PCT Pub. No.: WO2019/174821
PCT Pub. Date: Sep. 19, 2019

(65) Prior Publication Data
US 2021/0016600 A1  Jan. 21, 2021

(30) Foreign Application Priority Data
Mar. 13, 2018 (DE) .................... 10 2018 203 796.5

(51) Int. Cl.
*B60B 7/00* (2006.01)
*B60B 5/02* (2006.01)
*B60B 3/10* (2006.01)

(52) U.S. Cl.
CPC .............. *B60B 7/0086* (2013.01); *B60B 5/02* (2013.01); *B32B 2605/00* (2013.01); *B60B 3/10* (2013.01);
(Continued)

(58) Field of Classification Search
CPC .......... B32B 7/027; B32B 7/028; B32B 5/12; G12B 1/02; F16K 31/002; F16K 15/16;
(Continued)

(56) References Cited

U.S. PATENT DOCUMENTS

| 4,593,953 A * | 6/1986 | Baba ......................... B60B 7/00 301/6.3 |
| 2002/0019189 A1* | 2/2002 | Blonder .................. G09F 19/00 374/E1.002 |

(Continued)

FOREIGN PATENT DOCUMENTS

| DE | 3122194 A1 * | 6/1981 |
| DE | 29 47 682 A1 | 7/1981 |

(Continued)

OTHER PUBLICATIONS

International Search Report (PCT/ISA/210) issued in PCT Application No. PCT/EP2019/052864 dated Jul. 5, 2019 with English translation (five (5) pages).

(Continued)

*Primary Examiner* — Kip T Kotter
(74) *Attorney, Agent, or Firm* — Crowell & Moring LLP (57) ABSTRACT

A fiber-composite ventilation flap for a vehicle is made of a laminate formed by at least two individual tiers. At least one of the individual tiers has respective unidirectionally oriented fibers, and wherein the at least two individual tiers are arranged in the laminate in such a way that the fibers thereof are oriented at least predominantly differently to one another. The fibers of the at least two individual tiers are oriented differently to one another in such a way that at least one region of the fiber-composite ventilation flap curves about a predefined primary axis under the influence of heat and is thereby in an open state.

4 Claims, 3 Drawing Sheets

(52) U.S. Cl.
CPC ... *B60B 2360/341* (2013.01); *B60B 2900/513* (2013.01)

(58) Field of Classification Search
CPC .......... B60K 11/085; B60B 5/02; B60B 3/10; B60B 2360/341; B60B 7/04; B60B 7/06; B60B 7/061; B60B 7/065; B60B 7/0086
See application file for complete search history.

(56) References Cited

U.S. PATENT DOCUMENTS

| | | | | |
|---|---|---|---|---|
| 2007/0184238 A1* | 8/2007 | Hockaday | ............... | B32B 27/36 428/98 |
| 2009/0195053 A1* | 8/2009 | Kruse | ................... | B60B 7/0053 301/6.4 |
| 2011/0094217 A1* | 4/2011 | Chen | ....................... | B32B 7/027 428/221 |
| 2018/0272798 A1 | 9/2018 | Fauser et al. | | |

FOREIGN PATENT DOCUMENTS

| | | | | | |
|---|---|---|---|---|---|
| DE | 19817432 C1 | * | 8/1999 | ............... | E06B 9/24 |
| DE | 202008007724 U1 | * | 11/2008 | ............... | B60B 7/02 |
| DE | 10 2012 017 709 A1 | | 3/2013 | | |
| DE | 10 2013 222 044 A1 | | 4/2015 | | |
| DE | 102013222044 A1 | * | 4/2015 | ........... | B60B 7/0086 |
| DE | 102016003963 A1 | * | 9/2016 | | |
| DE | 10 2016 210 756 A1 | | 12/2016 | | |
| DE | 10 2015 223 386 A1 | | 6/2017 | | |
| DE | 202017006371 U1 | * | 3/2018 | | |
| FR | 3 003 200 A1 | | 9/2014 | | |
| WO | WO 2017/089574 A1 | | 6/2017 | | |
| WO | WO-2018073362 A1 | * | 4/2018 | ............. | B32B 27/08 |

OTHER PUBLICATIONS

German-language Written Opinion (PCT/ISA/237) issued in PCT Application No. PCT/EP2019/052864 dated Jul. 5, 2019 (five (5) pages).

German-language Search Report issued in German Application No. 10 2018 203 796.5 dated Feb. 7, 2019 with partial English translation (13 pages).

Chinese-language Office Action issued in Chinese Application No. 201980017786.9 dated Jul. 28, 2022 with English translation (12 pages).

* cited by examiner

FIBER-COMPOSITE VENTILATION FLAP FOR A VEHICLE AND WHEEL FOR A VEHICLE

BACKGROUND AND SUMMARY OF THE INVENTION

The invention relates to a fiber-composite ventilation flap for a vehicle, as well as to a wheel for a vehicle.

In terms of the prior art, reference is made in an exemplary manner to DE 10 2013 222 044 A1.

The most diverse requirements are set for wheels of vehicles, in particular those of passenger motor vehicles. Apart from a sufficient strength at low weight, the wheels are in particular intended to facilitate a positive drag coefficient of the vehicle and be distinguished by a pleasing visual appearance. This also includes the fact that the visible external region of the wheels is contaminated only to a limited extent by the abrasive wear of the wheel brake provided on the internal side of the wheel of the wheels (thus the side facing the vehicle). In order for the latter in particular to be guaranteed it is known for the voids between all the spokes of a wheel to be covered in relation to the brake disk of the wheel brake that rotates conjointly with the wheel by means of a single disk-shaped cover element which is provided on the internal side of the wheel. Cover elements which individually cover spoke intermediate spaces are moreover also known.

Since the brake heats up extremely in particular when decelerating from high speeds of the vehicle, cooling of the brakes by an air stream between the exterior of the wheel, through the spoke intermediate spaces, and the brake is moreover desirable.

This creates conflicting objectives of an optimized drag coefficient and an optimal cooling of the brakes.

DE 10 2013 222 044 A1 herein describes a rim cover for a vehicle wheel for attaching to a vehicle rim, having at least one wing element for covering at least one portion of the rim, the wing element as a function of temperature being able to assume at least one first shape and one second shape. The wing element herein is configured as a layered composite from two materials having dissimilar coefficients of thermal expansion.

A layered composite of this type having two materials with dissimilar coefficients of thermal expansion (bi-material) is a solution for the conflicting objectives mentioned above, but the production of such a wing element on account of the adhesive bonding, or the mechanical joining, respectively, of the two materials is complex, cost-intensive, and prone to errors.

Moreover, it is often desirable for such a bi-material effect to also be utilized in regions of the vehicle other than the wheel cover.

It is thus an object of the invention to provide a flap for a vehicle as well as a wheel of a vehicle which are capable of eliminating the mentioned disadvantages of the prior art.

The object is achieved by a fiber-composite ventilation flap for a vehicle as well as by a wheel for a vehicle, having the features of the independent claims. Advantageous embodiments and refinements are the subject matter of the dependent claims.

A fiber-composite ventilation flap for a vehicle, in particular for a motor vehicle, is proposed herein.

The fiber-composite ventilation flap herein is formed from two primary components, the fibers and the matrix, in particular a plastics-material matrix. Carbon fibers are preferably considered as fibers herein, and a specific, preferably thermosetting, plastics material (for example a resin) is considered as a matrix. Such a carbon-fiber composite plastics material is in this instance also referred to as CFRP.

Furthermore, the fiber-composite ventilation flap is constructed from a laminate having at least two individual tiers. The group of the laminate utilizes all advantages of the individual fiber alignment. The laminate is formed from a plurality of semi-finished fibrous products (for example woven fabrics, cross-laid fabrics, mats) which have dissimilar primary fiber directions and here are referred to as individual tiers and are placed on top of one another. At least one of the individual tiers herein is configured as a layer having fibers which are in each case unidirectionally oriented. Individual tiers of this type are also referred to as a UD layer (=unidirectional layer). A unidirectional layer of this type refers to a layer of which the fibers are predominantly oriented in the same direction. A further tier (in particular the passive individual tier discussed later) herein can also be configured as a cross-laid fabric or a braided fabric or a woven fabric which comprises fibers which are not only disposed so as to be unidirectional in relation to one another but already have dissimilar orientations on account of being interlaced. The individual tiers from woven fabric herein are configured as a layer having fiber bundles of dissimilar orientations and are also referred to as a MD layer (=multidirectional layer). Dissimilar fiber types can also be used in MD layers. For example, carbon fibers can thus be used together with glass fibers, for example. This fiber combination results in a configurable anisotropic material behavior of this layer, depending on which fiber type is used and the proportion and the fiber orientation of the fiber type in the MD layer.

The individual tiers are preferably brought together so as to form a tier stack or a tier bundle, respectively, and the matrix is subsequently added. The addition of the matrix herein in the closed mold can take place by infiltration, or outside the mold, or at an open mold, respectively, by spraying or casting, respectively. The individual tiers herein are thus preferably already present as a cross-laid fabric with fibers such that the individual tiers only have to be placed on top of one another or layered on top of one another, respectively, when forming the laminate and are joined or constructed, respectively, so as to form a laminate in a suitable process, in particular a wet pressing method.

A further possibility lies in layering semi-finished fibrous products which are already soaked with the matrix.

The fiber-composite ventilation flap, or the laminate, respectively, herein is preferably formed from at least seven, particular preferably from ten, individual tiers of this type which are stacked on top of one another. However, it is also possible for thicker individual tiers to be used so that not as many individual tiers for achieving a specific thickness and thus a specific strength of the fiber-composite ventilation flap are required.

The layering of the laminate, or the forming of the laminate, respectively, by placing the single individual tiers or the layers (or a braided fabric, respectively), respectively, on top of one another herein substantially determines the properties of the component. This is because different properties can be achieved depending on the direction in which the fibers of the layers are oriented in relation to one another.

Fiber-composite materials at a specific fiber orientation can represent anisotropic materials, that is to say that the properties of the material differ in different spatial directions. This also applies to the coefficient of thermal expansion. This coefficient defines the longitudinal variation of a material in the event of a thermal input. In single fiber/ matrix layer, thus a UD layer or an individual tier, respectively, this factor is significantly lower in the direction of the fiber than perpendicular to the fiber. Since the individual tiers, or the UD layers, respectively, likewise display the anisotropic properties, the properties of the laminate or of the fiber-composite ventilation flap, respectively, depend on the orientation of the individual tiers or the fibers of the latter, respectively (for example on the fiber proportion and the fiber type). The resulting thermal expansion of the fiber-composite ventilation flap is consequently a function of the orientation of the fibers of the individual layers, of the fiber proportion and of the fiber type. It is this effect that is to be utilized in this invention so as to cause the fiber-composite ventilation flap to fold over or unfold, respectively.

It is therefore provided in this invention that at least two individual tiers are placed on top of one another such that the fibers of the two individual tiers are dissimilarly oriented in relation to one another, thus are not disposed so as to be mutually parallel.

It is particularly preferably provided that the individual tiers in terms of the fiber orientation thereof are mutually disposed or layered, respectively, so as to be asymmetrical to a central plane of the laminate.

This herein is particularly preferably more than only one individual tier but rather a bundle or a stack, respectively, of individual tiers.

It is furthermore provided herein that the fibers of these at least two individual tiers or UD layers, respectively, are mutually oriented in such a manner that at least one region of the fiber-composite ventilation flap under the influence of heat preferably warps about a predefined primary axis and thus represents an unfolded state. As has already been mentioned, it is therefore advantageous for the individual tiers to be layered on top of one another such that the fiber-composite ventilation flap per se has a tiered construction which is asymmetrical in relation to a central plane of the fiber-composite ventilation flap. Such an asymmetrical tiered construction in this instance means that the fiber-composite component displays anisotropic properties in terms of the thermal expansion.

In one further preferred embodiment of the invention it is provided that the fiber-composite ventilation flap in the direction of the thickness or the height, respectively, (this being determined by the number of tiers which are layered on top of one another) of the component comprises at least two functional regions. These functional regions are formed by layering a plurality of individual tiers configured with the same fiber orientation.

The laminate herein is preferably composed of so-called active individual tiers, passive individual tiers, and transition tiers.

Accordingly, the respective functional regions are preferably formed from individual tiers of which the fiber orientation in the respective functional region is identical. Active individual tiers herein are those of which the fibers are oriented parallel to the primary axis and which fibers under the influence of heat expand in the direction perpendicular to the primary axis (hereunder also referred to as the primary expansion direction). In contrast, passive individual tiers are those of which the fibers are oriented perpendicularly to the primary axis (when viewed in a horizontal plane, thus along the width of the fiber-composite axis), thus oriented perpendicularly to the fibers of the active individual tiers, and which fibers have a minor or negligible, respectively, thermal expansion in the primary expansion direction.

The fiber-composite ventilation flap herein, when viewed along the vertical axis or along the thickness or the height, respectively, of the fiber-composite ventilation flap, is divided into at least two functional regions, specifically into an active functional region and a passive functional region. The active functional region herein comprises exclusively active individual tiers, while the passive functional region comprises only passive individual tiers. The thickness (or the depth, respectively) of the laminate is determined or predefined, respectively, by the number of individual tiers layered on top of one another.

The primary axis herein describes the axis about which a part of the fiber-composite ventilation flap is able to warp under the influence of heat. This means, for example, that the primary axis at least approximately divides the face of the fiber-composite ventilation flap into a face which folds over (under the influence of heat) and a face which does not fold over (under the influence of heat).

In order for the fiber orientation to be more easily assignable, a coordinate system in which the mentioned primary axis represents the 0° axis is assumed hereunder. An axis which is disposed so as to be perpendicular to the primary axis and conjointly with the latter defines a horizontal plane of the fiber-composite component (which at least approximately forms the face of the plate-shaped fiber-composite ventilation flap) herein is referred to as the 90° axis or the longitudinal axis, respectively. The longitudinal axis herein in the event of a thermal input into the fiber-composite ventilation flap herein points at least approximately in the primary expansion direction. A coordinate axis which is disposed so as to be perpendicular and vertical to the two axes and which conjointly with both axes, thus the 0° axis and the 90° axis, defines a vertical plane (in relation to the planar or flat, respectively, fiber-composite ventilation flap) is referred to as the vertical axis. The vertical axis is predefined or determined, respectively, by the layered construction of the single individual tiers, or the thickness of the laminate, respectively. A central plane which, when viewed from the vertical axis, is configured so as to be parallel to the horizontal plane herein is disposed in the center of the tiered construction of the fiber-composite ventilation flap, thus that position on the vertical axis at which the layered construction of the individual tiers in terms of the number thereof is divided into equal portions. The central plane of the fiber-composite ventilation flap herein describes the plane which is configured so as to be parallel to the individual tiers and which divides the tiered construction of the laminate, or the thickness of the laminate, respectively, into two (preferably identical) halves.

In one advantageous embodiment of the invention, the tiered construction of the fiber-composite ventilation flap is constructed so as to be asymmetrical in relation to the central plane so that the fiber-composite ventilation flap displays anisotropic properties.

The active functional region herein represents that part of the fiber-composite ventilation flap that in the direction of the 90° axis, thus perpendicularly to the primary axis, has a high thermal expansion in the primary expansion direction, wherein the passive functional region represents a lower thermal expansion in the primary expansion direction.

Since the individual tiers (by the matrix, or preferably by a resident and a curing agent) are connected to one another so as to form an asymmetrical laminate, the dissimilar thermal expansions of the functional region and of the individual tiers lead to a deformation of the fiber-composite ventilation flap.

In one further preferred embodiment of the invention, the fiber-composite ventilation flap in a non-warped state represents an at least approximately flat or planar, respectively, component which extends in a planar manner in particular along the 0°-90° plane, thus the horizontal plane. In the event of a thermal input, thus upon reaching a specific ambient temperature, the fiber-composite ventilation flap preferably warps in the direction of the vertical axis about the primary axis. The fiber-composite ventilation flap as from a specific temperature range reaches an unfolded or opened, respectively, position.

As has already been mentioned further above, it is furthermore preferable for the individual tiers or UD layers, respectively, to be disposed in bundles so as to lie on top of one another. Accordingly, the fiber-composite ventilation flap preferably comprises at least one bundle from unidirectional individual tiers which lie on top of one another, wherein the fibers of the individual tiers of one bundle are oriented in the same direction, thus are disposed so as to be mutually parallel. Bundling of this type of a plurality of UD layers having a parallel fiber alignment can moreover contribute toward an inherently stable component.

It is furthermore preferably provided herein that the active functional region of the fiber-composite ventilation flap comprises at least one active bundle in which the fibers of the individual tiers of the bundle are aligned so as to be at least approximately parallel to the primary axis. On account of the fibers in the individual tiers of this bundle being aligned so as to be parallel to the primary axis, a deformation, or a thermal expansion, respectively, of the active bundle in the direction of the fibers in the event of a thermal input is minor, while the thermal expansion in the direction of the longitudinal axis, or in the primary expansion direction, respectively, is high. The active bundle thus extends in the direction perpendicular to the primary axis, thus in the primary expansion direction. The active bundle is particularly preferably constructed from at least five individual tiers.

It is furthermore preferably provided that the passive functional region of the fiber-composite ventilation flap is constructed from at least one passive individual tier. A passive individual tier herein refers to an individual tier of which the fibers are aligned in the direction of the longitudinal axis. This passive individual tier herein particularly preferably forms an external face of the fiber-composite ventilation flap, specifically particularly preferably that external face or surface, respectively, that when viewed in the direction of the vertical axis in a folding movement of the fiber-composite ventilation flap is disposed in the unfolding direction. Accordingly, the passive individual tier, when viewed in the direction of the vertical axis, is preferably disposed above the active bundle and thus forms a surface and preferably also an external side of the fiber-composite ventilation flap. The uppermost passive individual tier which is to represent the visible surface of the fiber-composite ventilation flap is particularly preferably configured as a woven fabric or a knitted fabric, respectively, in which the fibers are configured so as to be interknitted, or interwoven, respectively, in the direction of the primary axis as well as in the direction of the longitudinal axis. It is furthermore not required that a passive individual tier represents a unidirectional individual tier but that the passive individual tier can also be configured as a woven fabric or a knitted fabric or a braided fabric, respectively.

As has already been described, the active functional region in the event of a thermal input expands in a direction perpendicular to the primary axis along the face of the fiber-composite ventilation flap. The uppermost passive individual tier, by virtue of the fiber orientation thereof in the direction perpendicular to the primary axis, in the event of a thermal input barely expands in the direction perpendicular to the primary axis. By virtue of the individual tiers, or the bundles, respectively, being connected to one another by the matrix, the mentioned passive individual tier in the passive functional region blocks the expansion of the fiber-composite ventilation flap in the direction perpendicular to the primary axis. The active bundle which, when viewed on the vertical axis, is preferably disposed at the bottom therefore expands in the direction perpendicular to the primary axis, while the passive individual tier does not expand conjointly with the former. The fiber-composite ventilation flap deforms in the direction of the vertical axis, on account of which the fiber-composite ventilation flap is opened.

It is also possible for a bundle of passive individual tiers instead of only a single passive individual tier to be disposed in the passive functional region. However, it is particularly preferable for ideally fewer of the passive individual tiers to be disposed since the latter in the event of a thermal input expands in the direction of the primary axis and, on account thereof (according to the same principle as the warping about the primary axis), cause warping of the lateral regions of the fiber-composite ventilation flap about an axis other than the desired primary axis. Any other warping of the fiber-composite ventilation flap that does not take place at least substantially about the mentioned primary axis impedes the warping capability of the fiber-composite ventilation flap about the primary axis. Opening or unfolding, respectively, to any greater extent is thus prevented or minimized, respectively.

The ratio of the number of active individual tiers to passive individual tiers is also particularly significant herein.

It is therefore particularly preferable for more active individual tiers than passive individual tiers to be at all times disposed in the laminate such that an expansion of the fiber-composite ventilation flap in the primary expansion direction and thus warping about the primary axis is dominant.

In one further preferred embodiment of the invention a transition region is provided between the active functional region and the passive functional region of the fiber-composite ventilation flap. The transition region herein is formed from dissimilar (but at least two) transition tiers. The transition tiers in terms of the fiber orientation thereof are mutually disposed or layered on top of one another, respectively, so as to be symmetrical in relation to a central plane of the transition region. The central plain herein is disposed so as to be parallel to the transition tiers and preferably divides the number of transition tiers in the transition region into two identical halves. In other words, the central plane of the transition region is that horizontal plane that divides the tiered construction of the transition region into two halves of identical thickness (or halves configured with the same number of tiers, respectively).

On account of a symmetrical disposal of the transition tiers of this type, the transition region displays a distortion-free expansion in the event of a thermal input. A distortion-free expansion herein is to be understood such that the component in the event of a thermal input, aside from a potential planar expansion, does not warp or expand or deform respectively, in spatial directions other than in the planar plane. The component in this instance preferably displays isotropic or quasi-isotropic, respectively, properties (at least in the planar direction but not in the thickness direction of the component). In this case, it is preferable for only the mentioned transition region of the fiber-composite ventilation flap to display a mentioned distortion-free expansion in the event of a thermal input, or such an isotropic or quasi-isotropic, respectively, behavior. The quasi-isotropic behavior of the transition region herein refers to a specific property being independent of the direction. In this specific case, the isotropic property in the planar direction in relation to the thermal expansion of the transition region is in particular alluded to. This means that the transition region in the event of a thermal input in the planar direction preferably expands in a manner independent of any direction. An expansion independent of any direction means that the transition region expands uniformly in the planar direction, or within the planar plane. The thermal expansion of the transition region on account of the material herein is preferably negligibly minor.

The transition region herein does not mandatorily have to display isotropic properties. It suffices for the mentioned symmetrical transition region conjointly with the inherently mirrored tiers in the event of a temperature variation to be imparted only a variation in terms of size but not a variation in terms of shape (such as warping or bending), thus to be imparted only a distortion-free expansion. A composite material at a temperature can increase or decrease, respectively, in size to a different extent in various directions almost without any distortion. In particular when using carbon fibers, the variation in length in the fiber direction is very minor and comparatively large in the direction transverse to the fiber direction such that the properties here are determined by the matrix. The predominantly used matrix systems are plastics material which, as is known, have a relatively high coefficient of thermal expansion.

The transition tiers herein are particularly preferably tiers of which the fibers (when viewed in the horizontal plane) are oriented at +45° or −45° to the primary axis. The two dissimilar transition tiers hereunder are also referred to as the +45° tier and the −45° tier. When the identical number of transition tiers are mutually disposed so as to be symmetrical in relation to the mentioned central plane of the transition tier in a laminate, then the transition tiers compensate one another in terms of the thermal expansion. The transition tiers serve for stabilizing the laminate.

It is particularly preferable herein that the transition region comprises an identical number of +45° tiers and −45° tiers which are layered on top of one another so as to be symmetrical to the central plane of the transition region. A transition region which is symmetrical in relation to the central plane can thus be implemented.

Alternatively, the transition region can also comprise, for example, two transition bundles which, when viewed in the direction of the vertical axis, are disposed between the active bundle and the at least one passive individual tier. The first transition bundle herein is again constructed from a plurality of transition tiers and is disposed in such a manner that the fibers of these transition tiers are aligned or oriented, respectively, at an angle of 45° in relation to the primary axis (when viewed in the horizontal plane). The second transition bundle which is disposed on the first transition bundle is likewise constructed from transition tiers, wherein the fibers of the latter are aligned at an angle of −45° to the primary axis.

The mentioned transition bundles are in each case preferably constructed by way of at least three transition tiers. It is furthermore preferable for the first transition bundle and the second transmission bundle to be mutually disposed so as to be symmetrical in relation to the central plane.

It is furthermore possible for the transition region to not be configured from a plurality of unidirectional transition tiers but from cross-laid fabrics or a knitted fabric, wherein the fibrous cross-laid fabrics are interconnected in such a manner that the fiber orientations of +45° and −45° are already configured in a knitted tier. In such a case, the transition tiers no longer represent unidirectional tiers.

The transition region in which the mentioned transition bundles are disposed, for example, herein is preferably disposed between the active functional region and the passive functional region.

Such a transition region enables the robustness of the laminate to be increased and stabilizes the component. On account of the preferably symmetrical disposal of the transition tiers of the transition region and of the chosen fiber orientation of the transition tiers, the transition region in the event of a thermal input is imparted a uniform thermal expansion in the direction parallel and perpendicular to the primary axis, the thermal expansion being however negligibly minor. On account thereof, no thermally induced warping actions are created in this region. Therefore, the transition region expands in a distortion-free manner in the event of a thermal input. The transition region herein particularly preferably behaves so as to be isotropic or quasi-isotropic, respectively, in the planar direction, or in relation to the planar plane, respectively. By way of the mentioned transition bundles it is thus possible to avoid any deformation of the fiber-composite ventilation flap, or of the laminate, respectively, in the undesirable directions already explained above. The stiffness of the laminate can thus be increased, this in turn increasing the robustness of the component. The more transition tiers comprised in such a transition region, the stiffer the configuration of the fiber-composite ventilation flap. The greater the inherent stiffness of the fiber-composite ventilation flap, the greater the resistance counter to the component warping or deforming, respectively. Depending on the field of application of the fiber-composite ventilation flap, a desired stiffness and degree of warping can thus advantageously be set by way of the number of transition tiers, or the variation of transition tiers, respectively.

A fiber-composite ventilation flap according to the invention for a vehicle, in particular for a motor vehicle, having the construction of individual tiers according to the invention and the fiber orientation of said individual tiers, enables the use of a folding function in the most varied regions in the vehicle without additional energy having to be applied, for example by means of a motor or an actuator, respectively. The fiber-composite ventilation flap herein enables such a folding function or unfolding function, respectively, under thermal input to be implemented in a single component, the latter being composed of a single material, specifically a fiber-composite plastics material. Such a fiber-composite ventilation flap can be used at any location, or in any region, respectively, in the vehicle where a cover is required and at the same time cooling is required as from a specific temperature. This can be, for example, on a wheel for a vehicle.

A wheel for a vehicle which comprises a cover element which in turn comprises a fiber-composite ventilation flap which is configured as claimed is proposed herein.

The wheel herein in turn comprises a rim, a hub portion, as well as at least two spokes that connect the hub portion to the rim. A spoke intermediate space which is covered by the cover element is disposed between the two spokes.

The fiber-composite ventilation flap is thus used at least as part of a cover element for covering at least part of a spoke intermediate space of a wheel for a vehicle.

When the ambient temperature about the fiber-composite ventilation flap is below a specific limit temperature, for example when the vehicle is stationary, the fiber-composite ventilation flap herein is preferably in a state in which it is folded shut or closed, respectively.

The friction energy used in particular for the frequent deceleration of a disk brake is largely converted to heat.

Upon reaching the specific limit temperature in the region of the wheel or the region of the rim, respectively, the fiber-composite ventilation flap of the cover element opens or folds, respectively, axially away from the wheel. The unfolding under the influence of heat herein takes place by virtue of the embodiment of the fiber-composite ventilation flap (thus the chosen fiber orientation and the position of the functional regions, for example).

The unfolded fiber-composite ventilation flap in this instance enables an air stream between the exterior of the wheel and the interior of the rim in order for the brake assembly disposed therein to be cooled.

It is preferably provided herein that the cover element comprises the fiber-composite ventilation flap, or that the fiber-composite ventilation flap is disposed on the cover element, respectively. The cover element, aside from the fiber-composite ventilation flap, herein preferably comprises a cover element part which is fixedly connected to the wheel (for example to the spoke).

The cover element part herein is particularly preferably an injection-molded plastics-material component which is configured so as to be at least approximately planar.

The fiber-composite ventilation flap in this instance is preferably linked to this cover element part. In order for the mentioned folding movement to be nevertheless enabled herein, only at least a peripheral region, or end portion, respectively, of the fiber-composite ventilation flap herein is preferably fixedly connected to the cover element, or to the cover element part, respectively.

This connection herein is particularly preferably configured as a form-fit. The fiber-composite ventilation flap herein particularly preferably comprises rail-type shapes which are already incorporated in the production process of the fiber-composite ventilation flap and which can be push-fitted into a recess provided therefor in the cover element or in the cover element part, respectively, a form-fitting connection between the cover element and the fiber-composite ventilation flap thus being able to be established.

The mentioned rail-type shapes herein are particularly preferably already integrated in the component in the production process, in particular in a wet-pressing method of the fiber-composite ventilation flap, by way of a corresponding shaping of the tool. These rail-type shapes herein are preferably configured from the matrix material of the fiber-composite ventilation flap and reinforced with fibers (in particular carbon fibers), in particular short or long fibers.

The corresponding receptacles for the rail-type shapes of the fiber-composite ventilation flap in the cover part element can likewise be incorporated directly in the production of the cover element part, for example in the injection-molding method.

Thermally-induced warping and thus an anisotropic behavior is not desirable in the region in which the mentioned preferable form-fit on account of the rail-tape connection elements is disposed in the fiber-composite ventilation flap. This thermally-induced warping can lead to undesirable stresses in the connection. A remedy herein would be, for example, a portion having a tiered construction which deviates from the remainder of the fiber-composite ventilation flap. This portion can be configured as an active flap portion, for example, and should preferably be of an inherently symmetrical construction in order for the thermal deformation undesirable in this portion to be prevented. The transition region of the fiber-composite ventilation flap is ideally disposed so as to be continuous in the connection region to the cover element part. Neither an active nor a passive functional region is disposed in this connection region. This leads to an increased robustness or strength, respectively, of the component subdivided into two individual tiers. For example, it is thus possible for a symmetrical tiered construction (for example the transition region) to be disposed in the region where the fiber-composite ventilation flap is connected to the cover element such that this region in the planar direction, or in relation to the planar plane, respectively, displays isotropic or quasi-isotropic, respectively, properties and is not imparted any or a negligently minor, respectively, thermal expansion.

In order for the cover element not to be dropped off during a rotation of the wheel, or during the travel of the vehicle, respectively, the cover element part is in turn preferably fixedly connected to the wheel, in particular to one or two spokes.

It is furthermore preferable for the fiber-composite ventilation flap to be disposed on the cover element so as to be able to warp or deform, respectively, about the primary axis, as has already been described above.

Disposed herein means that the cover element in a non-unfolded state is at least partially adjacent to the cover element part, or at least partially bears on the cover element part, respectively. In the non-unfolded state of the fiber-composite ventilation flap there is particularly preferably no offset in the actual direction of the wheel between the fiber-composite ventilation flap and the cover element part. Instead, the fiber-composite ventilation flap conjointly with the cover element part in a non-unfolded state of the fiber-composite ventilation flap forms a contiguous common cover element which is at least approximately disposed in a flat or planar manner, respectively.

It is furthermore preferable herein that a second end region which at the other side of the fiber-composite ventilation flap is disposed opposite, or lies opposite, respectively, the first end region (to which the cover element part is preferably fastened) warps in the event of a thermal input.

It is furthermore preferable herein that the parameter of the tiered construction and of the production are conceived in such a manner that the fiber-composite ventilation flap in the installed state in the wheel at room temperature, or at 20° C., respectively, is configured so as to be slightly warped toward the inside (thus in the direction of the interior of the wheel) and is thus disposed, or bears, respectively, so as to be pre-loaded on the cover element part. It can thus be ensured that the fiber-composite ventilation flap at warm external temperatures (without any significant heating of the brake) is not deformed, or folded over, respectively, to an opened state.

These and further features are evident not only from the claims but also from the description and the drawings, wherein the individual features can be implemented in each case individually or as a plurality in the form of sub-combinations in an embodiment of the invention, and can represent advantageous and inherently protectable embodiments for which protection is claimed here.

The invention will be further explained hereunder by means of an exemplary embodiment. All of the features described in more detail herein may be relevant to the invention.

DETAILED DESCRIPTION OF THE DRAWINGS

Figure 1:
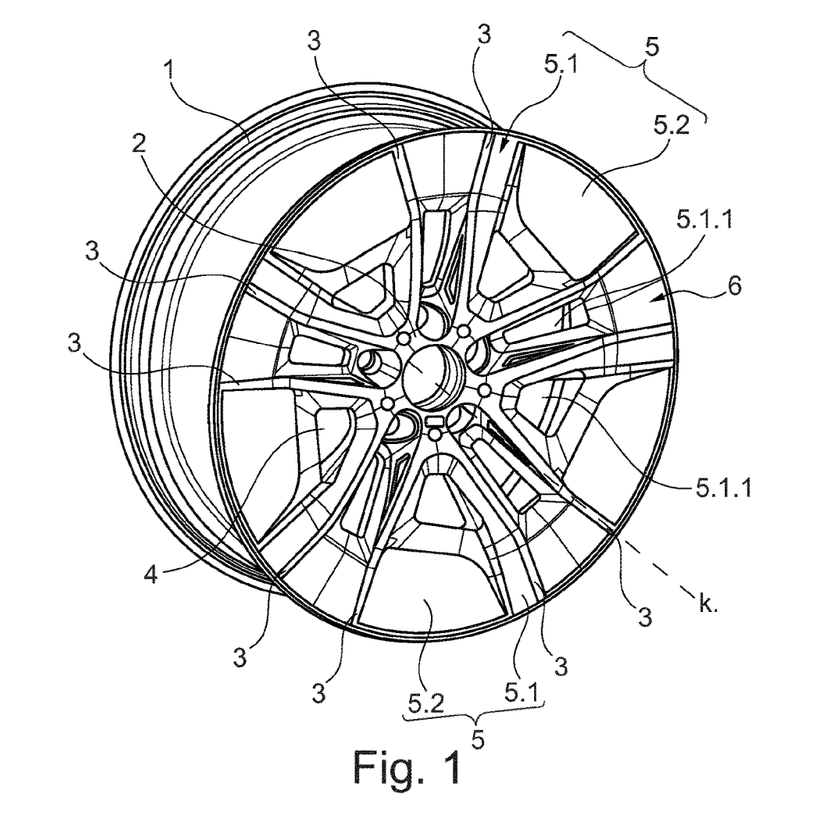
FIG. 1 shows a wheel of a vehicle in a three-dimensional view from the external side of the wheel, in an exemplary embodiment of a fiber-composite ventilation flap according to the invention.

FIG. 1 shows an exemplary wheel for a vehicle in a three-dimensional external view or a lateral view, respectively. The wheel herein comprises a rim 1, a hub portion 2, as well as a plurality of spokes 3 that connect the hub portion 2 to the rim 1. A cover element 5, 6 which is capable of at least partially covering the spoke intermediate spaces 4 from the outside herein is in each case disposed between two spokes 3, thus in the spoke intermediate space 4.

A cover element 5 herein is configured in two parts. This cover element 5 herein comprises a cover element part 5.1 which is configured from a plastics material, as well as an exemplary fiber-composite ventilation flap 5.2.

The cover element part 5.1 herein is fixedly connected to the wheel, in particular to the spokes 3.

The fiber-composite ventilation flap 5.2 of the cover element 5 at one side, or at an end region, respectively, herein is connected in a form-fitting manner to the cover element part 5.1 and otherwise bears on a support face of the cover element part 5.1. The fiber-composite ventilation flap 5.2 is thus capable of moving, or folding over, respectively, the side not fastened to the cover element part 5.1 in the axial direction away from the wheel (thus in the direction of the external side of the wheel). For material-related reasons, with the exception of a specific thermal influence, no actuators or further materials are required for folding over the fiber-composite flap 5.2. The fiber-composite ventilation flap 5.2 herein is configured from a single material, specifically a fiber-composite material, in particular a carbon-fiber reinforced plastics material.

The cover element 5 of the wheel particularly has that advantage that the cover element 5 mitigates the conflict of objectives of sufficient covering of the regions of the wheel that have an air flow passing therethrough, thus optimizing the drag coefficient, and of optimizing the cooling of the brakes of the wheel when decelerating the vehicle from high speeds.

The cover element 5 in a specific comparatively low temperature range of the wheel, thus for example at low speeds of the vehicle in which the brake is not yet significantly heated, as is illustrated in FIG. 1, thus represents an at least approximately flat and inherently closed component (with the exception of the existing recesses 5.1.1). From an aerodynamic point of view, this situation represents an optimal condition.

Figure 2:
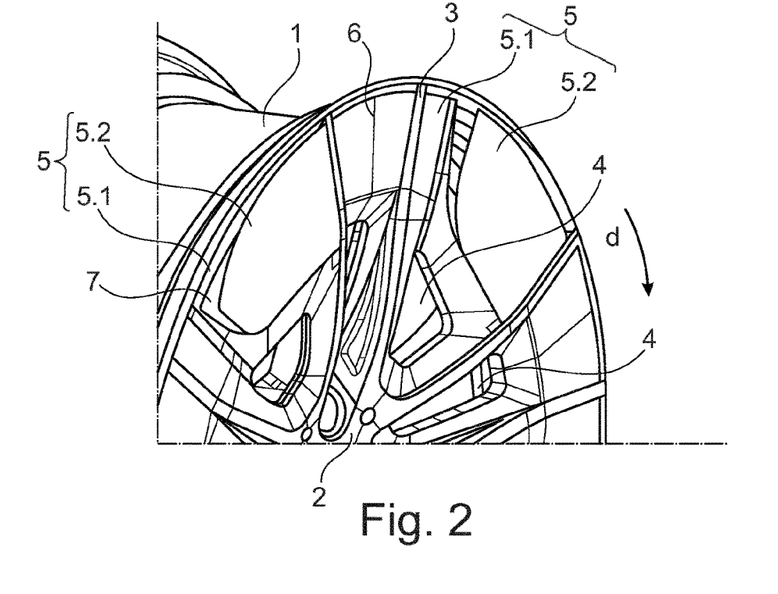
FIG. 2 likewise shows a three-dimensional view of the wheel from FIG. 1 in a detailed view onto the fiber-composite ventilation flap while the wheel is rotating.

For example, when the vehicle now decelerates from a very high speed, using the brake (not visible) disposed in the wheel, very high temperatures are created in the interior of the wheel on an account of the friction between the brake pads (not shown) and a brake disk (not shown). Once the brake herein reaches a specific limit temperature, the fiber-composite ventilation flap 5.2 of the cover element 5 folds at least approximately in the axial direction away from the wheel, or in the direction of the exterior of the wheel, respectively, as is shown in FIG. 2. A gap 7 is created between the wheel and the cover element 5. An air stream through this gap 7 for cooling the brakes is now possible, wherein a best-possible covering for optimizing the drag coefficient is still provided at the same time.

As can be seen in FIG. 1 as well as in FIG. 2, the cover element 5, or the cover element part 5.1, comprises recesses 5.1.1 which are located on the circular face of the external side of the wheel, close to the hub portion 2. The region of this circular face of the external side of the wheel close to the rim 1 herein is completely covered by the cover element 5. The reason therefore lies in that the drag coefficient is relevant mainly in the outer regions of the circle, wherein this drag coefficient increasingly diminishes in terms of relevance or influence, respectively, closer to the interior of the circle, thus closer to the hub portion 2.

The rotation direction d herein is identified by an arrow in FIG. 2. This unfolding movement herein takes place due to the material, without any further influence aside from the limit temperature, and will be explained in more detail hereunder by means of FIGS. 5 and 6.

Figure 3:
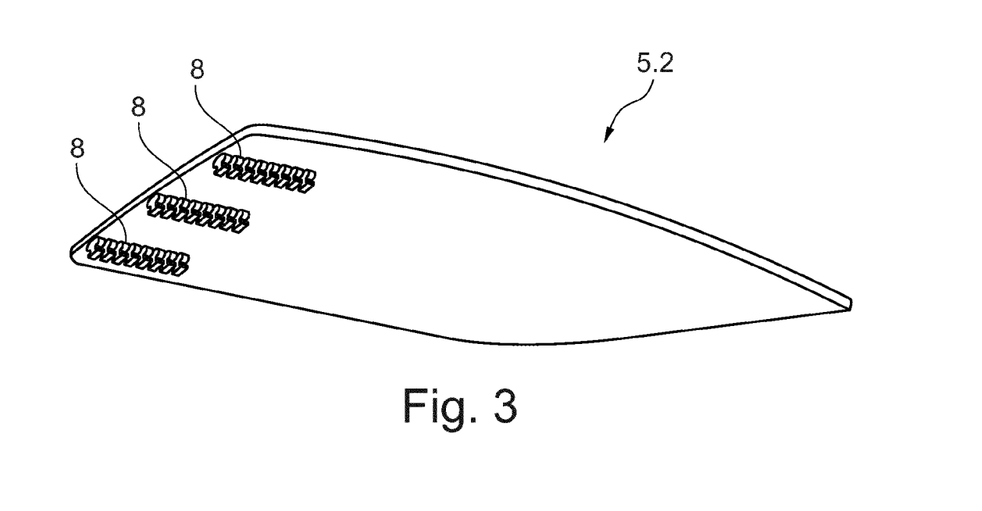
FIG. 3 shows the fiber-composite ventilation flap for the wheel from FIG. 1 and FIG. 2 in an individual three-dimensional view from the rear.

The fiber-composite ventilation flap 5.2 in FIG. 3 is shown individually in a three-dimensional view from below or from the rear, respectively, as the fiber-composite ventilation flap 5.2 in the state installed in the wheel can be seen from the interior of the wheel. Fastening elements 8 for fastening the fiber-composite ventilation flap 5.2 to the cover element part 5.1 can in particular be seen herein. The fastening elements 8 herein are configured as rail-shaped geometries which are preferably integrated into the fiber-composite ventilation flap 5.2 already in the production method of the latter. These rail-shaped geometries in the cross section thereof herein are configured so as to be T-shaped. These rail-shaped geometries herein are particularly preferably configured from the matrix material of the fiber-composite ventilation flap 5.2 and reinforced with additional carbon fibers (short or long fibers).

As can furthermore be seen, the fastening elements 8 are disposed only on one side of the fiber-composite ventilation flap 5.2 and in particular in a peripheral region of the latter.

Figure 4:
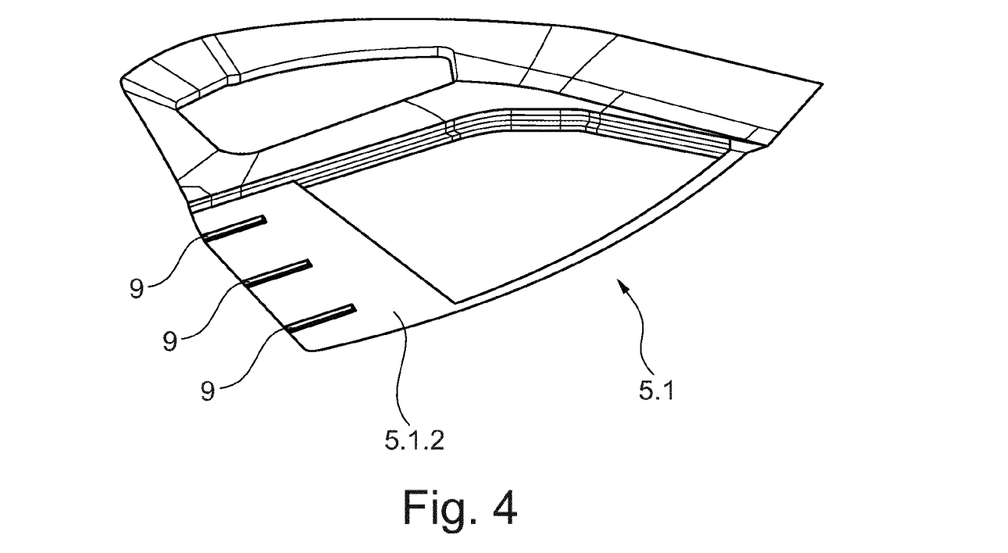
FIG. 4 shows a cover element part which is capable of receiving the fiber-composite ventilation flap from FIG. 3 in the wheel.

The fiber-composite ventilation flap 5.2 is then fastened to the cover element part 5.1 by means of the fastening elements 8, as is illustrated in FIG. 4. The fastening herein takes place as a form-fit, wherein the rail-shaped geometries of the fiber-composite ventilation flap 5.2 are push-fitted into recesses 9 provided therefor on the cover element part 5.1. A fixed form-fitting connection can be implemented on account of the T-shaped configuration of the fastening elements 8 of the fiber-composite ventilation flap 5.2 and of the matching recesses 9 of the cover element part 5.1.

As can be seen in particular in FIG. 4, the fiber-composite ventilation flap 5.2 is connected to the cover element part 5.1 only by way of the fastening elements 8, while the fiber-composite ventilation flap 5.2 in a non-unfolded state otherwise bears on, or in a planar manner lies against, respectively, a bearing face 5.1.2 of the cover element part 5.1 that corresponds to the shape of the fiber-composite ventilation flap 5.2. The covering element part 5.1 thus additionally serves as a support plate or a support structure, respectively, for the fiber-composite installation flap.

The cover element part 5.1 is then connected to the wheel, in particular to the spokes 3 of the wheel, by way of further connection elements (not included in the drawings).

Figures 5, 6:
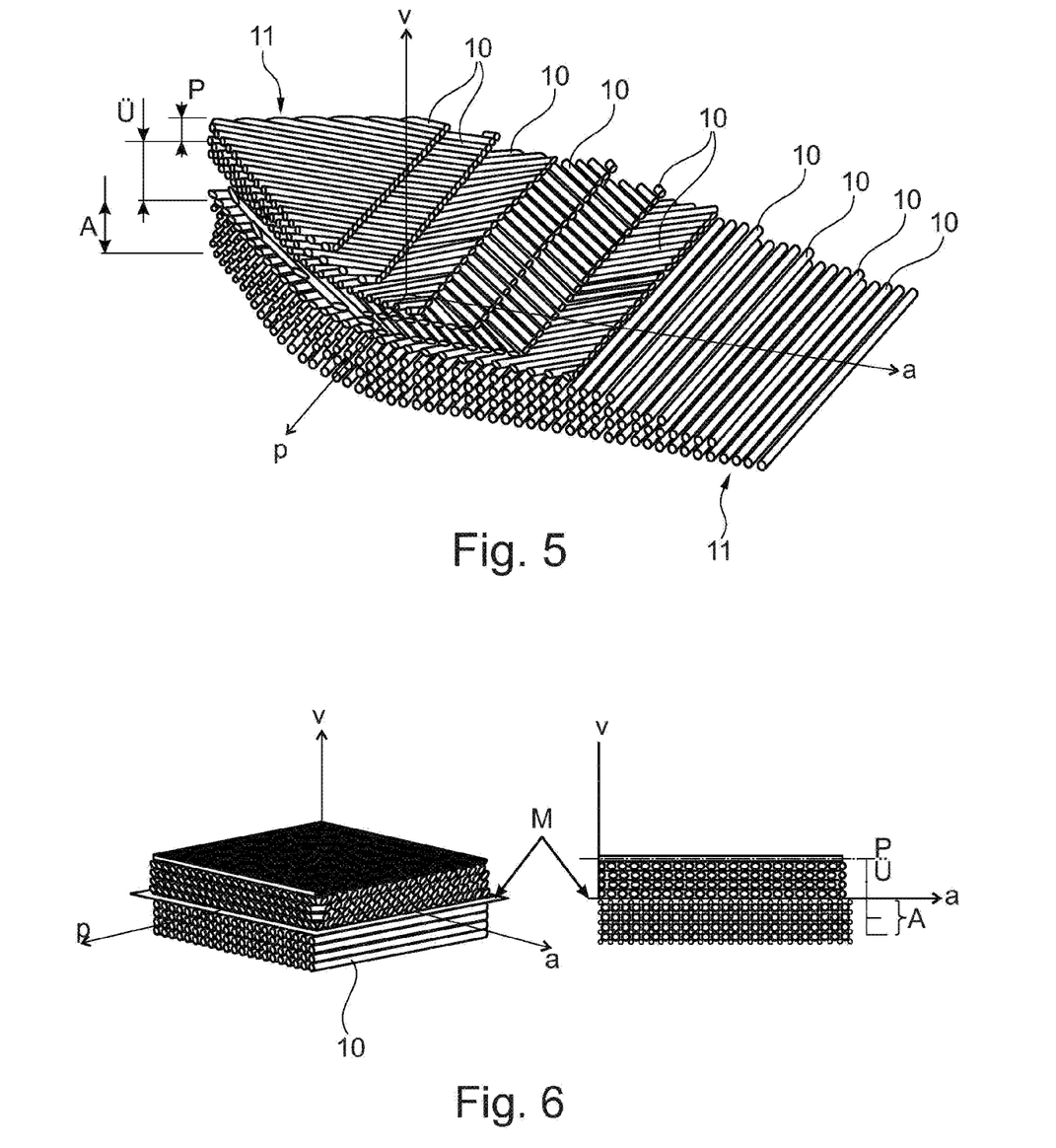
FIG. 5 shows an exemplary tiered construction of the fiber-composite ventilation flap from FIG. 3 in a sectional view.
FIG. 6 schematically shows a further exemplary tiered construction of the fiber-composite ventilation flap.

FIG. 5 shows an advantageous fiber and tiered construction of the fiber-composite ventilation flap from FIGS. 1, 2, and 3. The individual tiers 11 for the sake of clarity herein are shown so as to be released from one another and shown in a sectional view in order for the fiber orientation of the lower individual tiers 11 to be able to be seen. In the none-sectioned state, thus the real state, of the fiber-composite ventilation flap the shown individual tiers from FIG. 5 all lie directly on top of one another and thus form a laminate of identical depth or height, respectively (along a vertical axis v).

The fiber-composite ventilation flap 5.2 herein is constructed from a plurality of so-called UD layers, or unidirectional individual tiers 11, respectively, which lie on top of one another. These layered tiers 11 in the constructed state are referred to as a laminate.

Each individual tier 11 herein is formed from fibers 10 which are disposed so as to be mutually parallel and from a matrix which is disposed between the fibers 10 but not illustrated in FIG. 5.

The matrix is typically composed of a plastics material or a resin, respectively, and a curing agent.

For reasons of clarity, only the fibers 10 of one individual tier 11 are depicted in FIG. 5. The fibers 10 in this example are configured as carbon fibers. As has already been mentioned, the fibers 10 of an individual tier 11 are aligned so as to be mutually parallel, this property also being referred to as unidirectional. The fibers 10 of each individual tier 11 are accordingly oriented in the same direction, thus so as to be mutually parallel.

Fiber-composite materials, thus the mentioned individual tiers 11, for example, and also the laminate, may be anisotropic materials. Anisotropic means that the material properties differ in different spatial directions. This also applies to the coefficient of thermal expansion. When a unidirectional individual tier 11 is thus considered per se, the thermal expansion in the fiber direction (=fiber longitudinal direction) is thus minor while the thermal expansion perpendicular to the fiber direction is high (when viewed in the width or the face of the individual tier, respectively).

As has already been mentioned and can be seen in FIG. 5, the fiber-composite ventilation flap 5.2 herein is constructed from a plurality of individual tiers 11 layered on top of one another. The cohesion of these individual tiers 11 is considered to be ideal and is referred to as a laminate. Since the respective individual tiers 11 display anisotropic properties, the properties of the laminate are a function of the orientation of the individual tiers 11, more specifically of the orientation of the fibers 10 in the individual tiers 11. Consequently the resultant thermal expansion of the fiber-composite ventilation flap 5.1 is a function of the orientation of the fibers 10 of each individual tier 11. For example, when two individual tiers of dissimilar orientation are connected so as to form one component, a thermal input into the component leads to thermal expansions. The expansions of the individual tiers 11 in the same spatial directions herein are dissimilar. Since the two individual tiers 11 are connected to one another such dissimilar expansions lead to a deformation of the component (in a manner analogous to a known bi-metal effect). The tiered construction according to FIG. 5 herein shows an advantageous embodiment in order for the fiber-composite ventilation flap 5.2 to be optimally opened under thermal influence. This embodiment will be described in more detail hereunder.

In order for the directional indications to be more readily understandable, a coordinate system as plotted in FIG. 5 is assumed in this example.

In this coordinate system, p represents the primary axis about which the fiber-composite ventilation flap 5.2 warps in the event of a thermal input. The vertical axis is represented by v, the latter determining the height or the thickness, respectively, of the fiber-composite ventilation flap 5.2. The vertical axis v in the installed state of the fiber-composite ventilation flap 5.2 is disposed so as to be at least approximately parallel to the wheel rotation axis k. The fiber-composite ventilation flap 5.2 in the event of a thermal input warps in the direction of the vertical direction. The longitudinal axis of the fiber-composite ventilation flap 5.2 herein is represented by a, the latter conjointly with p representing a horizontal plane of the fiber-composite ventilation flap. The respective axes are always disposed so as to be mutually perpendicular.

The exemplary laminate from FIG. 5 herein is constructed from a total of ten unidirectional individual tiers 11 which are layered on top of one another along the v-axis.

The laminate herein is composed of so-called active individual tiers, passive individual tiers, and transition tiers.

Active individual tiers herein are those of which the fibers 10 are oriented parallel to the primary axis p and which under the influence of heat expand in the direction of the longitudinal axis a. In contrast, passive individual tiers are those of which the fibers 10 are oriented parallel to the longitudinal axis a, thus perpendicular to the fibers of the active individual tiers, and which in the direction of the longitudinal axis a have a minor, or negligible, respectively, thermal expansion.

The transition tiers are tiers of which the fibers (when viewed in the horizontal plane p-a) are oriented at either +45° or −45° to the primary axis or the longitudinal axis, respectively. When the same number of both transition tiers are disposed in a laminate (mutually disposed so as to be symmetrical to a central plane), these two transition tiers thus compensate one another in terms of the thermal expansion. The transition tiers serve for stabilizing the laminate.

The fiber-composite ventilation flap 5.2 disposed along the vertical axis v, or along the tiered construction of the former, respectively, herein is divided into three functional regions, an active functional region A, a passive functional region P, and a transition region Ü. The active functional region A herein comprises exclusively active individual tiers, while the passive functional region P comprises only passive individual tiers, and the transition region Ü comprises only transition tiers.

FIG. 6 shows a fragment of the tiered construction of the laminate in a three-dimensional view as well is in a lateral view, or in the v-a plane, respectively, wherein the coordinate system in the center of the laminate (when viewed along the vertical axis v) shows a central plane (parallel to the horizontal plane p-a) which uniformly divides the laminate into two tiered constructions of identical thickness (assuming that an even number of tiers are located in the laminate).

According to FIG. 5 it is provided that the first four individual tiers, or the lowermost four individual tiers, respectively, of the laminate (when viewed in terms of the vertical axis v) are active individual tiers and thus represent the active functional region A. Under the influence of heat, these active individual tiers, or the active functional region A, respectively, expand/expands in the direction of the longitudinal axis a. Since the fiber-composite ventilation flap 5.2 at an end portion is fixedly connected to the cover element part 5.1, the active functional region A expands in the direction of the opposite end portion along the longitudinal axis a of the fiber-composite ventilation flap 5.2.

Four transition tiers which form the transition region Ü are layered so as to be contiguous to the active functional region A. First, a transition tier at +45° (this being an angle in relation to the primary axis p in the horizontal plane), thereafter two transition tiers at −45°, and finally one more transition tier at +45°, are layered on top of one another herein.

The two last individual tiers form the passive functional region P. Two passive individual tiers herein are layered on top of one another. The passive functional region P does not expand in the direction of the longitudinal axis a in the event of a thermal input.

On account of the individual functional regions in the fiber-composite ventilation flap 5.2 being connected to one another by the matrix, the passive functional region P impedes the active functional region A in any expansion in the direction of the longitudinal axis a. The component is deformed or warped, respectively. The flap opens on account of this warping.

As opposed to the embodiment from FIG. 5, only a single passive individual tier forms the passive functional region P in FIG. 6. As is shown by the illustration of the laminate in the v-p plane, a very pronounced and dominating active functional region A and a very small passive region P are created on account of the construction. These regions are separated by the stabilizing transition region Ü. This transition region Ü is composed of four individual tiers having the mentioned angle of +/−45° in relation to the longitudinal axis and the primary axis. In the case of the transition region Ü it is to be noted that the latter is inherently symmetrical and is composed of two individual tiers having a +45° orientation and two individual tiers having a −45° orientation, these individual tiers being mutually disposed so as to be symmetrical when viewed in terms of the central plane M. Taking into consideration these points, the transition region Ü can be constructed while maintaining its function. As has already been described above, the transition region Ü offers a possibility of setting the stiffness and the degree of deformation of the fiber-composite ventilation flap 5.2, depending on the number and the disposal of the transition tiers.

Since the number of active individual tiers is significantly higher than the number of passive individual tiers, the thermal expansion in the direction of the longitudinal axis a dominates in the v-a plane. When viewed in terms of the plane v-p, the lower ratio of active individual tiers to passive individual tiers leads to a minimum expansion in the direction of the primary axis p.

The thermally induced deformation of the laminate, or of the fiber-composite ventilation flap 5.2, respectively, in the state installed in the wheel of the vehicle is illustrated in FIG. 2. To this end, the fiber-composite ventilation flap, by way of the passive individual tier, is linked to the wheel so as to be aligned in the axial direction away from the wheel.

LIST OF REFERENCE SIGNS

1 Rim
2 Hub portion
3 Spoke
4 Spoke intermediate space
5 Cover element
5.1 Cover element part
5.1.1 Recess
5.1.2 Support plate
5.2 Fiber-composite ventilation flap
6 Cover element
7 Gap
8 Fastening element
9 Receptacle
10 Fiber
11 Individual tier
p Primary axis
a Longitudinal axis
v Vertical axis
A Active functional region
P Passive functional region
Ü Transition region
d Rotation direction
k Wheel rotation axis
M Central plane

What is claimed is:

1. A wheel for a vehicle, comprising:
a cover element which comprises a fiber-composite ventilation flap, wherein the fiber-composite ventilation flap comprises a laminate having at least two individual tiers, wherein
at least one of the individual tiers has fibers which are in each case unidirectionally oriented, and
the at least two individual tiers are disposed in the laminate such that the fibers of the two individual tiers are at least predominantly dissimilarly oriented in relation to one another such that at least one region of the fiber-composite ventilation flap warps under influence of heat as a function of the dissimilarly oriented two individual tiers, and is able to convert from a closed state to an unfolded state;
a rim;
a hub portion; and
at least two spokes that connect the hub portion to the rim, wherein
at least one spoke intermediate space between the at least two spokes is at least partially covered by the cover element.

2. The wheel according to claim 1, wherein
the fiber-composite ventilation flap of the cover element is configured exclusively from a fiber-composite material and, under influence of heat, is able to be at least partially unfolded axially away from the wheel.

3. The wheel according to claim 1, wherein
at least one end portion of the fiber-composite ventilation flap is fixedly connected to a cover element part, and another end portion of the fiber-composite ventilation flap is able to warp about a primary axis.

4. The wheel according to claim 3, wherein
the connection between the fiber-composite ventilation flap and the cover element part is a form-fit.

* * * * *